July 13, 1926. 1,592,019
O. WEBER
SAFETY TOWING DEVICE
Filed Jan. 29, 1926 2 Sheets-Sheet 1
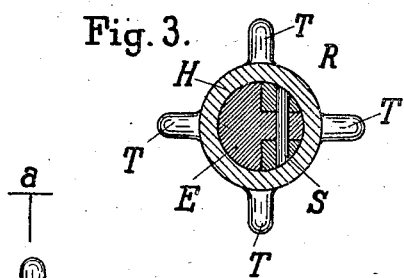
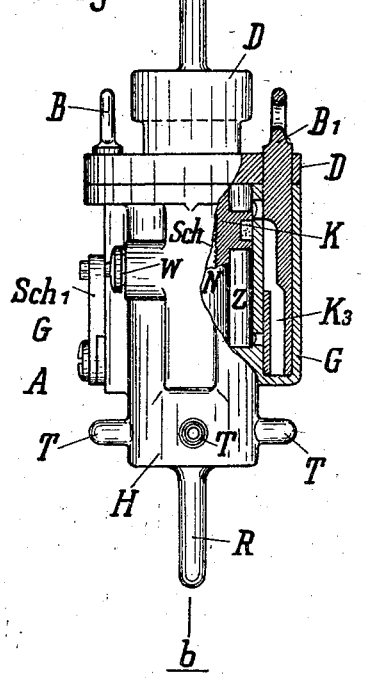
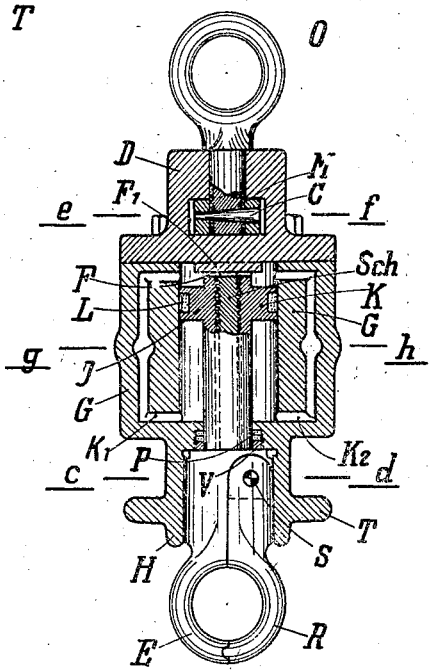
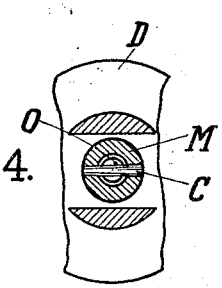
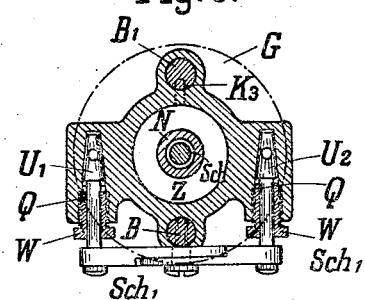
Inventor:
Otto Weber
by his Attorney July 13, 1926. 1,592,019
O. WEBER
SAFETY TOWING DEVICE
Filed Jan. 29, 1926 2 Sheets-Sheet 2

Inventor:
Otto Weber

Patented July 13, 1926.

1,592,019

UNITED STATES PATENT OFFICE.

OTTO WEBER, OF DRESDEN-ALTSTADT, GERMANY.

SAFETY TOWING DEVICE.

Application filed January 29, 1926, Serial No. 84,789, and in Germany August 1, 1924.

The present invention relates to safety towing devices, particularly adapted for ships and executed as hydraulic cylinders or pistons while a pressure liquid acts as sealing medium.

One of the objects of the invention is to improve towing devices of the type mentioned in such a manner that the sealing liquid contained in the hydraulic cylinder and preferably consisting of oil is retained on releasing, i. e., opening, of the towing devices and not lost as is now the case.

Another object is to execute the towing device so as quickly bring it back into working position and connect it again with the towing rope after the latter has been released without requiring any tools or laborious manipulations.

Furthermore, the present invention aims at causing or providing a very rapid automatic release of the towing rope so as to reduce the danger to the tug boat of being upset when the rope pulls very strongly in a lateral direction still more than is pos25 sible today.

It is also one of the objects of the present invention to execute the towing device so as to effectively prevent any unintentional uncoupling between rope and towing device in case of quickly changing tractive forces.

Figure 8:
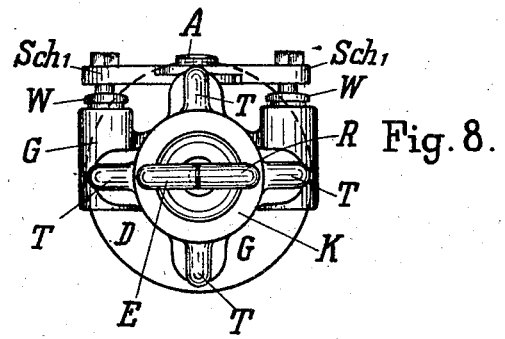
Figure 6:
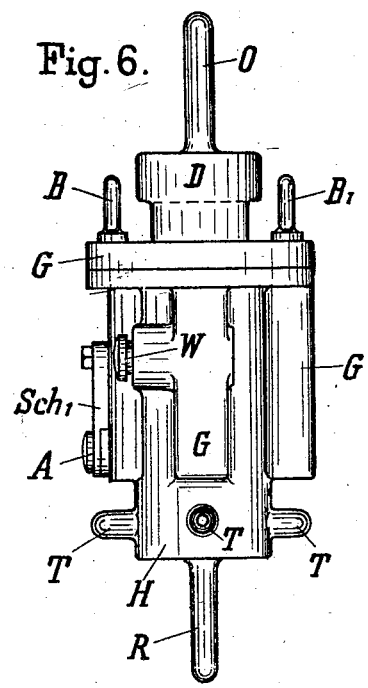
Figure 7:
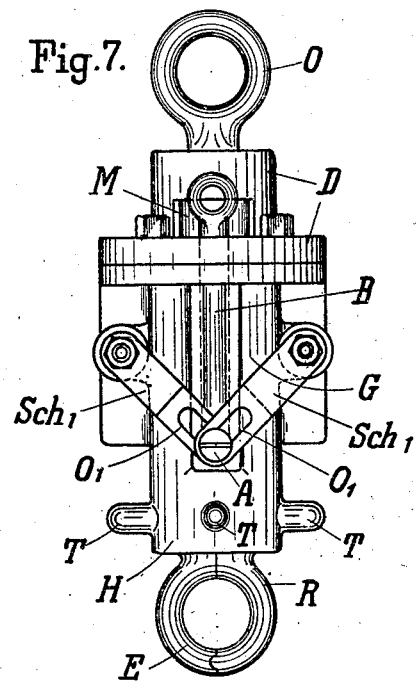
Figure 9:
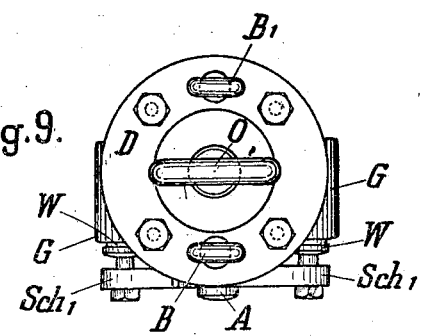

One form of the invention is described in the specification and illustrated in the accompanying drawing, in which Figure 1 is a side view of the towing device, partly in section; Fig. 2, a longitudinal section of the entire device on the line $a$—$b$, Fig. 1; Fig. 3, a cross section of the releasing eye on the line $c$—$d$, Fig. 2; Fig. 4, a cross section of the head of the cylinder cover on the line $e$—$f$, Fig. 2; Fig. 5, a cross section of the device on the line $g$—$h$, Fig. 2; Fig. 6, another side view of the entire device; Fig. 7, another side view of the device turned at an angle of 90°; Fig. 8, a front view of the towing eye; and Fig. 9, a view of the suspension hook seen from the other side.

As indicated by Figs. 1, 2, 5 and 6 the safety towing device according to this invention consists of a hydraulic cylinder G having a boring Z, in which is guided the piston K. The latter is preferably of the solid or disc type and provided with a piston rod N which is perforated and provided with internal thread I.

The face of the piston K, as shown in this modification is provided with an elevation and a groove F which is engaged by a corresponding part $F^1$ of the cylinder cover D whenever the piston is in working position. The piston K is suitably packed with respect to the wall of the cylinder G and protected against shifting when in operating position, i. e., when the member $F^1$ engages the groove F.

The cylinder G intended for receiving the pressure liquid, preferably oil, is, in the modification shown, provided with by-pass canals $K^1$, $K^2$, which are fitted with shut-off and delivery devices such as cocks $U^1$, $U^2$.

As particularly indicated by the Figs. 5 and 7, the shutting-off cocks $U^1$, $U^2$ are connected by rocking arms $Sch^1$ provided with slots $O^1$ at their free ends. The rocking arms $Sch^1$ engage the shaft of the shutting-off valves which are provided with suitable packings Q in the cylinder G and secured by screws W.

To open and close the shutting-off cocks, a rod B has been provided which engages the slots $O^1$ of the rocking arms $Sch^1$ by means of a bolt A. The rod B is capable of executing a sliding movement in the longitudinal direction of the device and actuates on its upward movement the two shutting-off valves $U^1$, $U^2$ so as to open the by-pass canals $K^1$, $K^2$ and thus permit the sealing liquid to flow into the space above the piston K. The latter and the piston rod N as well as the towing eye E, R move outwardly so that the latter opens automatically and releases the hawser as will be described in detail below.

The towing eye shown in the present modification consists of two members, i. e., the member E connected with the piston rod N and a closing piece R linked-on by means of a hinge-pin S. These two members are arranged in a socket H connected with the hydraulic cylinder and are capable of moving in a longitudinal direction so that the towing eye, on entering the socket H, is closed and kept in closed position by the socket H while, on leaving the socket H, the towing eye will automatically open and thus release the hawser.

Between the socket H and the oil chamber Z of the cylinder G a packing P, V has been arranged. The socket H is further provided with externally extending cam-like pins T to facilitate the operation of the entire device, particularly when the piston is pressed back by hand into its working position according to Fig. 2.

Aside from the by-pass canals K¹ and K² which are arranged parallel to one another and which permit a rapid over-flowing of the sealing liquid when the shutting-off cocks U¹, U² are opened, a third by-pass canal has been provided as indicated in Fig. 1. Axially movable within this by-pass canal is a sluice valve B¹, which can move in longitudinal direction and which is provided with a canal K³. When pulling out the valve B¹ the openings of the canal K³ are on a higher lever than the openings of the by-pass canal and thus make possible the over-flow of the liquid.

The connection of the hydraulic cylinder G with the tug boat or vessel is established by means of the eye O which is slightly rotatably arranged in the head piece D of the cylinder cover and which is held in position by means of a nut M and a conical pin G.

The device functions briefly as follows: if a vessel is to be taken in tow, the hawser and its connecting organ is introduced into the eye E, R which is closed by bringing back the piston K to working position, as shown in Fig. 2. After the sealing liquid has entered the cylinder space Z the cocks U¹, U² are closed by pushing back the connecting rod into the position shown in Fig. 7. If the valve B¹ is not in its position of rest as per Fig. 1, it will be pushed back into it, so that all by-pass canals are closed. The connecting eye O is connected with the tugboat in a suitable manner, and the rod B serving for opening the canals K¹, K² is connected to the tugboat on both sides by means of traction members which extend towards starboard and port so as to leave a certain amount of free play. This free play permits the towing device to move laterally within certain limits i. e., to move from the center of the vessel during the work of tugging.

However, if the towing device is moved farther from its center position than the free play of the safety traction member extending towards port and starboard permits, the by-pass canals K¹, K² will be opened by the automatic backward movement of the rod B, the sealing liquid flows into the space above the pressure piston K which will move backwards together with the eye E, R, so as to automatically release the hawser.

In tugboat service the hawser, if automatic releasing devices are used, is usually connected with the tugboat by means of an auxiliary rope which acts when the hawser has been disconnected to prevent upsetting. This auxiliary rope permits the re-connection of the hawser without much loss of time so that the work of towing can be started again immediately after the tugboat and the vessel to be towed are in normal position.

For this purpose the safety towing device according to this invention can be easily put in working position again by a few turns of the hand, i. e., by getting hold of the cam T and pushing back the piston rod after the connecting organ of the hawser has been inserted in the eye E, R.

By pulling back the rod B to a position of rest as shown in Fig. 7 the by-pass canals K¹, K² are closed again, and the device is ready again for further towing work.

If it is desirable to disconnect the hawser for any reason, all that is necessary is to pull the valve B¹ open by means of rope leading to the bridge etc. so that the sealing fluid can flow.

I claim:—

1. In a safety towing device operating with a pressure liquid the combination of a hydraulic cylinder and piston whose rod is connected with an automatically opening eye while the cylinder receiving the pressure liquid is provided with by-pass canals and shutting-off organs arranged therein connected with rocking arms which have slots to which a connecting rod actuating the shutting-off organs in the same way is secured by bolts, the connecting rod being operated by a suitable tractive device.

2. In a safety towing device operating with a pressure liquid the combination of a hydraulic cylinder and piston whose rod is connected with an automatically opening eye while the cylinder receiving the pressure liquid is provided with by-pass canals, one of which being fitted with a co-axially moving sluice valve capable of being actuated by a suitable shutting-off device.

3. In a safety towing device operating with a pressure liquid the combination of a hydraulic cylinder and piston whose rod is connected with an automatically opening eye while the cylinder receiving the pressure liquid is provided with by-pass canals and shutting-off organs arranged therein and connected with tractive members, the automatically opening eye moving in a connecting piece of the cylinder executed as guide which, when in working position, firmly holds the eye together; the said eye opening automatically on leaving the guide which is provided with projecting cams to facilitate the work of returning the opened eye to its working position.

4. In a safety towing device operating with a pressure liquid the combination of a hydraulic cylinder and piston whose rod is connected with an automatically opening eye, the said piston having a groove cut into an elevation and the cover of the cylinder being provided with a corresponding member so as to prevent any turning of the piston in pushed-in condition by the engagement of the said member and groove.

In testimony whereof I affix my signature.

OTTO WEBER.